United States Patent [19]
Chlique

[11] 3,923,010
[45] Dec. 2, 1975

[54] INDUSTRIAL TECHNIQUE

[75] Inventor: Bernard G. Chlique, Sceaux, France

[73] Assignee: Babcock & Wilcox, Limited, London, England

[22] Filed: Aug. 20, 1973

[21] Appl. No.: 389,771

[30] Foreign Application Priority Data
Aug. 21, 1972 France .............................. 72.29771

[52] U.S. Cl. ..................... 122/483; 55/520; 55/444; 122/491
[51] Int. Cl. ............................................... F22g 5/16
[58] Field of Search ...... 122/483, 488, 491; 55/442, 55/443, 444, 520

[56] References Cited
UNITED STATES PATENTS

| | | |
|---|---|---|
| 1,443,134 | 1/1923 | Klug ...................................... 55/520 |
| 2,287,592 | 6/1942 | Andrews ............................ 122/491 |
| 3,494,339 | 2/1970 | Ferdundez et al. ................... 55/520 |
| 3,508,527 | 4/1970 | Durrer ................................ 122/483 |
| 3,713,278 | 1/1973 | Miller et al. ........................ 122/483 |

Primary Examiner—Kenneth W. Sprague
Attorney, Agent, or Firm—J. M. Maguire, Esq.; J. P. Sinnott, Esq.

[57] ABSTRACT

Steam drying device, notably, for thermal power plants.

It comprises several grates arranged side by side so as to be successively crossed by the wet steam, each grate being formed by a metal wire wound on suitably braced upper and lower parallel bars 1 and 2.

Applicable, notably, to the drying of steam after expansion in light-water nuclear power plants.

9 Claims, 10 Drawing Figures

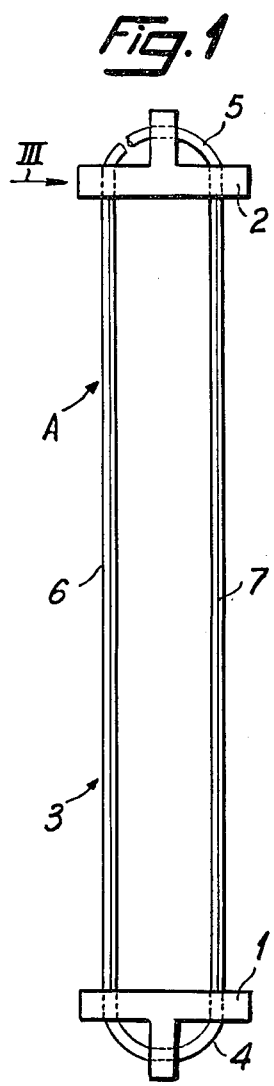
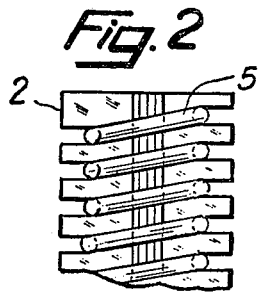
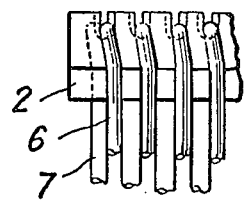
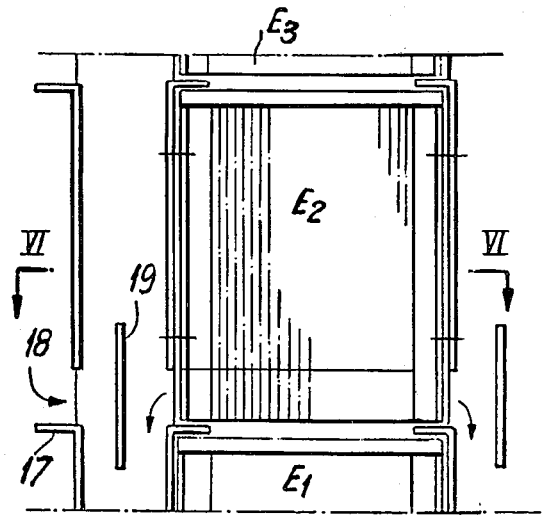
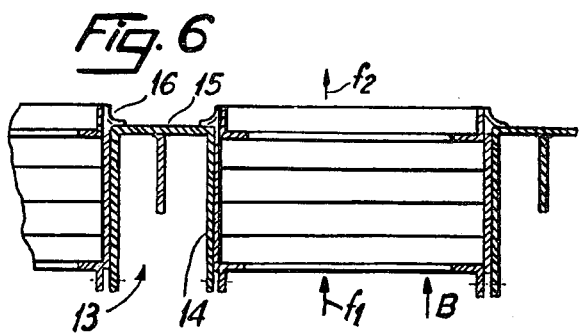

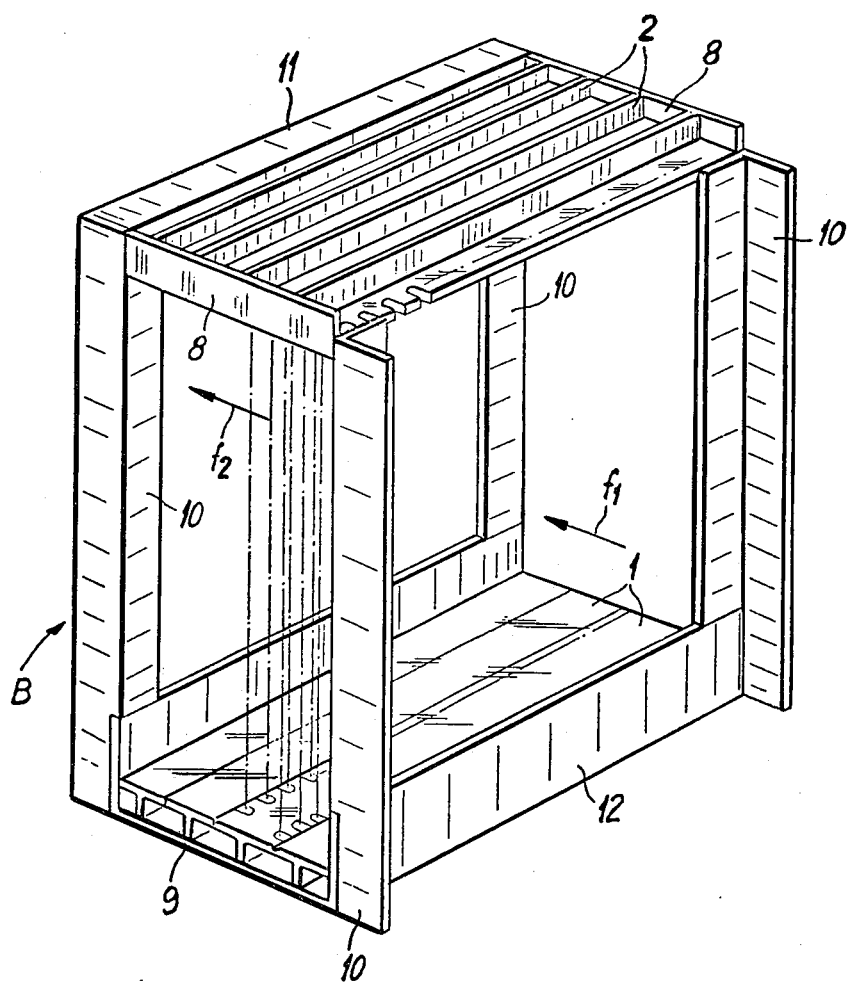

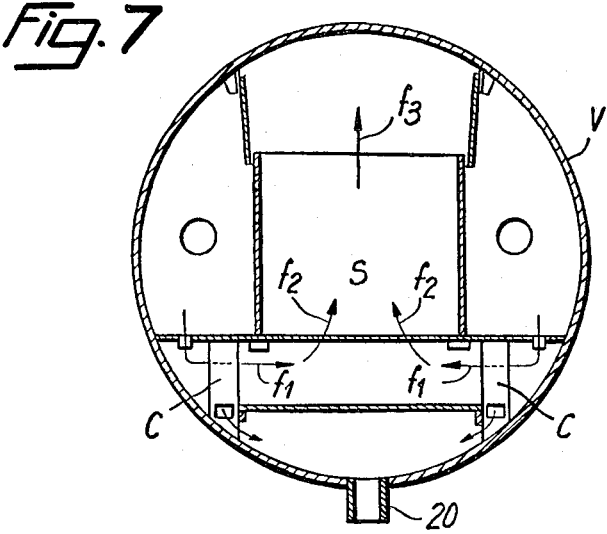
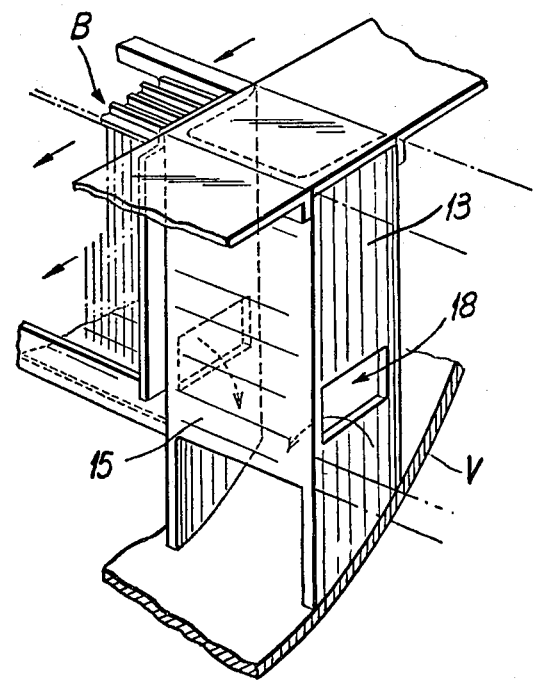

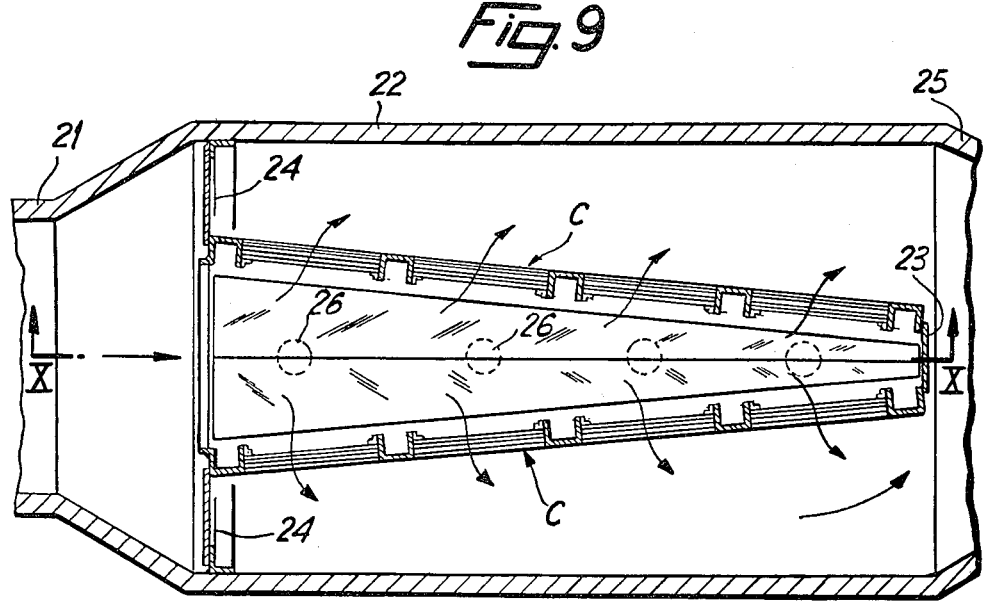
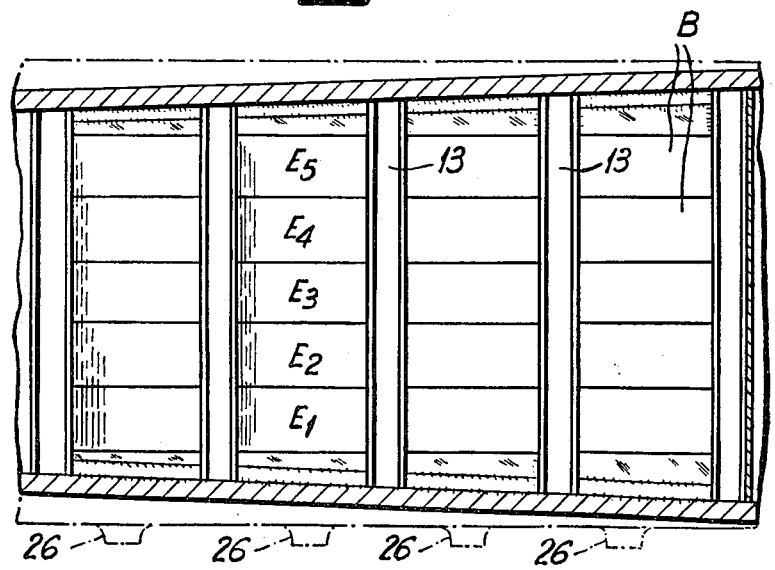

INDUSTRIAL TECHNIQUE

This invention concerns a steam drying device, applicable, notably, to reheater driers with which some steam power generating plants are equipped.

In nuclear power plants the steam is often reheated in the course of expansion either by live steam or by the steam emanating from high-pressure tapping. Light water units constitute one specific case. The saturated or slightly superheated steam produced by the nuclear boiler becomes very wet after partial expansion and it is necessary to precede reheating with prior drying in order to eliminate the fine droplets of water.

Drying is generally done by mechanical means, the water droplets being collected by baffles or on fine wire gauze.

These known devices have the following disadvantages:

The baffles produce a not negligible pressure loss. Furthermore, their efficiency is limited, particularly, with respect to fine particles dispersed in the form of fog. As a result, there is an appreciable reduction of the thermodynamic efficiency of the installation.

The fine wire gauze laid out in the form of a compact pile is more satisfactory from the standpoint of performance. It enables a higher rate of separation to be obtained. But it is fragile, which has prompted some manufacturers to ban its use for certain applications, owing to the risks incurred (for example, risk of carrying along fragments of wire into the primary circuit of a BWR or boiling water reactor).

In both these devices the speed of the steam across the drying element must be slow (in the order of 2 m/sec); the baffle or wire gauze driers are spread over a wide surface. To get the greatest efficiency out of these driers, it is necessary to install a complex wet steam guiding and distributing device ensuring a uniform distribution along the drying element. The large surface of the driers and the distribution pipes connected with them appreciably increases the volume of the equipment and the size of the installation.

The object of this invention is to eliminate those disadvantages and constraints and, in particular, to make a sturdy drying element, free from the risks of deterioration likely to produce waste, causing only a slight pressure loss on the drying steam circuit and ensuring good water-steam separation efficiency.

The invention offers for this purpose a steam drying device, characterized by several grates arranged side by side so that they can be successively crossed by a flow of wet steam, each grate being composed of a one-way network of vertical or inclined parallel bars, the bars of one grate being set up across or opposite the interstices of an adjacent grate.

The water droplets deposited on the surface of the bars flow by gravity along those bars in order to be suitably collected and discharged and the total elimination of the water content of the steam is ensured, in practice, by virtue of the arrangement of the bars of one grate in relation to the passages of an adjacent grate. The effectiveness of the device does not depend on the fineness of the bars, which can, for example, consist of 2-mm metal wire, thus eliminating the risks of deterioration in the course of assembly or operation.

According to one advantageous embodiment, the drying device contains a modular element composed of two bars kept one above the other at a suitable distance by bracing and a metal wire wound with constant pitch on those two bars, so as to form, on both sides of the plane commong to the longitudinal axes of the two winding support bars, two grates of parallel strands of wire, the strands of one of those grates being shifted by half a pitch in relation to those of the other.

The strands are conveniently vertical and two strands, shifted by half a pitch from each other, are directly connected to each other by a semicircular elbow formed by the metal wire folded over the upper or lower supporting bar.

The free space between successive strands is advantageously equal to the diameter of the wire.

Several such modules can be juxtaposed by stacking to form a multiple grate element on the passage of the steam to be dried. Furthermore, several of these elements can be placed in a row, one after each other, and/or superposed in height, so as to constitute a screen having the length and height dimensions required. This screen can serve to equip known assemblies of the type including a drier and a reheater placed in a common shell or else be set up inside a steam line designed to feed a reheater.

A screen of this type properly contains vertical spouts, inserted between the elements comprising it and intended to discharge the water retained by the grates.

The objects, characteristics and advantages of the invention will emerge, furthermore, from the description to be given below, involving embodiments chosen by way of example and represented on the attached drawings.

On these drawings:

FIG. 1 represents a modular drier element;

FIG. 2 represents a partial plan view of same;

FIG. 3 representa a partial view of same in elevation;

FIG. 4 represents in perspective a multiple grate element, composed of several modular elements of the kind represented on the foregoing figures;

FIG. 5 represents in partial elevation a screen composed of several multiple grate elements of the kind represented on FIG. 4;

FIG. 6 is a plan section, along line VI—VI of FIG. 5;

FIG. 7 represents in cross section a horizontal barrel plate containing a steam superheater and equipped with a steam drying device of the kind represented on FIGS. 5 and 6;

FIG. 8 represents in perspective a partial view of the installation of FIG. 7;

FIG. 9 represents two drying screens, set up according to the invention inside a steam pipe;

FIG. 10 represents a partial section in elevation, along line X—X of FIG. 9.

On FIGS. 1, 2 and 3 a drying element A contains two parallel bars 1 and 2, situated plumb with each other, suitably kept apart by a bracing, not represented, and a metal wire 3, alternately folded over these two bars, forming a winding with regular pitch, with lower semicricular elbows 4, obtained by folding the wire over lower bar 1, upper semicircular elbows 5, likewise formed on upper bar 2, and vertical strands 6 and 7 situated respectively to the left and right, on the view of FIG. 1, so as to produce, on both sides of the plane common to the longitudinal axes of the two bars, two grates composed of vertical strands regularly spaced to the pitch of the winding, the strands of one grate being shifted by half a pitch in relation to those of the other.

In the embodiment of FIGS. 1 to 3, the fabrication of element A is facilitated by the fact that lower bar 1 is a T-section, with vertical core pointing downward, while upper bar 2 is a T with vertical core directed upward, the flanges and cores of both sections each being provided with a series of regularly spaced grooves, which render bending of the wire easier, while ensuring exact positioning for each of vertical strands 6 and 7.

FIG. 4 represents in perspective a drier element B, with multiple grates, formed by juxtaposing side by side four elements A, of the kind described above. The upper bars 2 are brought in contact with each other by their respective flanges and are joined to each other at their ends by two vertical flats 8. As for lower bars 1, which also touch at their longitudinal edges, they are lodged in a flat-bottomed spout 9. The assembly is braced and supported by four vertical angle irons 10, set up at the four corners of a rectangle, so as to form a parallelepipedal-shaped drying space, fitted out with several parallel rows of vertical wires, the wires of one row being staggered in relation to those of the adjacent row or rows. In this parallelepipedal assembly the two main vertical faces, parallel to the direction of bars 1 and 2, have two openings for inlet and outlet of a flow of steam to be dried, which runs in the direction of arrows $f_1$ and $f_2$, that is, perpendicular to the opening planes. This opening is delimited by a rigid frame formed by two of angle irons 10 ith an upper crosspiece 11 and a lower tie 12 made of a vertical flat, which to some extent prevents the wet steam from sweeping the wet faces of lower bars 1.

FIGS. 5 and 6 schematically represent a drying screen composed of several multigrate elements B of the kind represented on FIG. 4. These elements, which are vertically superposed on three rows E1, E2 and E3 (FIG. 5), are placed adjacent to each other along their respective secondary faces, so as to form a screen or curtain of desired length, composed alternately of three elements B superposed in height and of a vertical spout 13, with U section, joined by its side faces 14 to elements B, which are juxtaposed on both sides of it. The bottom 15 of spout 13, situated in the vertical plane of the steam outlets, is joined by flexible tight plates 16 to the adjacent elements B.

The side faces 14 of spouts 13 have parts 17 cut off and bent to form windows 18, suitable situated in order to be able to discharge by vertical flow the water collected in the horizontal gutters 9 (FIG. 4). Opposite the windows thus machined, the spout sections 13 are stiffened by ribs internally welded to the walls of bottom 15.

In operation the wet steam enters the screen in the direction indicated by arrow $f_1$ (FIG. 6), deposits water droplets on wires 6, 7 and comes out in the direction indicated by arrow $f_2$ in the dry steam state. The drops of water collected by gutters 9 flow through windows 18 and fall along vertical spouts 13 in order to be discharged.

FIGS. 7 and 8 schematically represent an installation of known type, particularly based on French Pat. No. 70 43292 of Dec. 2, 1970, comprising a drier and a reheater lodged in a common shell, consisting of a long barrel plate V with horizontal axis. Superheater S is a nest of horizontal tubes. The drier is composed of two screens C of the kind described above, which extend over the length of barrel plate V, on both sides of nest S. A partitioning, which will not be described in detail, sets for the wet steam admitted into two compartments situated on both sides of the superheater the course marked by arrows $f_1, f_2, f_3$ successively crossing the two screens C in a centripetal horizontal direction and superheater S in an ascending vertical direction.

As appears on the view in perspective of FIG. 8, each screen C is composed of elements B arranged in a row on a single level. Vertical spouts 13 rest on the wall of barrel plate V, the spout bottom 15 being channeled at its lower end to enable the water collected to flow along the bottom of the barrel plate and end up at discharge pipes 20.

On FIGS. 9 and 10 a wet steam intake pipe 21 contains a widened section 22, in which there are two drying screens C, of the kind described above, composed of multiple grate elements B superposed on five levels E1 to E5. These two screens, situated on both sides of the vertical axial plane of section 22, extend over its entire length and are connected by a tight joint to its inner face, along both their upper and lower edges. Furthermore, they both converge toward the bottom in the direction of flow of the steam. The lower vertical edges of the two screens C are connected to each other, with a tight joint, by a partition 23, while each of their upper vertical edges is connected, with a tight joint, to the inner face of section 22 by an arc-shaped partition 24; the wet steam supplied by pipe 21 then enters between the two partitions 24 in the space, of width gradually diminishing downward, defined by the two convergent screens, crosses these two screens, along the course marked by arrows, and circulates downward, in the state of dry steam, in two spaces, of gradually increasing width, situated on both sides of those two screens, in order to arrive at the dry steam line 25. The passage offered to the steam in section 22 therefore varies, owing to the convergence of the two screens, in the same direction as the flow of steam, for the wet steam circulating between the two screens C as well as for the dry steam coming out of them.

As in the embodiment of FIGS. 7 and 8, the water deposited on the wires of elements B is collected by horizontal gutters 9, flows downward along vertical spouts 13 and is discharged by pipes 26 through the bottom of section 22.

The arrangements described above may, of course, undergo various changes in detail and variations, without thereby departing from the scope of the invention.

I claim:

1. Steam drying device forming a screen retaining water droplets for a steam power plant, characterized by several grates placed side by side so that they can be successively crossed by a flow of wet steam, each grate being composed of a network of parallel bars, the bars of one grate being spaced from the interstices of an adjacent grate, said grates each having two parallel bars spaced from each other, said bars having respective longitudinal axes forming a common plane and a metal wire wound on those two bars to form on both sides of the plane common to the longitudinal axes of the two bars two grates of parallel wire strands, the strands of one of the grates being shifted by half a pitch in relation to those of the other, and a discharge spout for supporting at least some of said bars and for discharging water retained by said device.

2. Device according to claim 1, in which the bars of one grate are parallel to those of an adjacent grate.

3. Device containing several multiple grate elements, as defined in claim 1, spaced from each other.

4. Device according to claim 3, having over its length multiple grate elements or units alternating with the spouts serving to discharge the water retained by the screen.

5. Device according to claim 4, equipped with gutters situated under the grates and emptying into the spouts and windows formed in the side walls of the said gutters.

6. Steam drying according to claim 1 comprising, a shell, a nest of superheater tubes within said shell, at least one of said steam drying devices, a partition for setting the wet steam a course successively crossing the drier and the superheater, and means for discharging the water retained in the drier.

7. Device according to claim 1 further comprising a pipe for channeling a flow of wet steam therewithin, said steam drying device being inserted in the passage of the flow of wet steam inside said pipe.

8. Device according to claim 7, wherein said wet steam pipe further comprises a widened portion, having on both sides of its axial plane two screens, said partition setting a course for the wet steam forcing it to enter the space between the two screens and cross said screens before continuing circulation in the dry steam state below said widened pipe portion.

9. Device according to claim 8, in which the two screens converge downward, in the direction of circulation of the steam.

* * * * *